US011222541B2

(12) United States Patent
Ikeda et al.

(10) Patent No.: US 11,222,541 B2
(45) Date of Patent: Jan. 11, 2022

(54) MOVABLE BODY MONITORING APPARATUS, AND VEHICLE CONTROL SYSTEM AND TRAFFIC SYSTEM USING THE MOVABLE BODY MONITORING APPARATUS

(71) Applicant: SUBARU CORPORATION, Tokyo (JP)

(72) Inventors: Satoru Ikeda, Tokyo (JP); Haruyo Miyakawa, Tokyo (JP); Hyoungwook Choi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 172 days.

(21) Appl. No.: 16/440,081

(22) Filed: Jun. 13, 2019

(65) Prior Publication Data

US 2020/0105141 A1 Apr. 2, 2020

(51) Int. Cl.
*G08G 1/16* (2006.01)
*G08G 1/01* (2006.01)
*H04W 4/40* (2018.01)

(52) U.S. Cl.
CPC ............ *G08G 1/166* (2013.01); *G08G 1/0116* (2013.01); *G08G 1/0141* (2013.01); *G08G 1/164* (2013.01); *H04W 4/40* (2018.02)

(58) Field of Classification Search
CPC ...... G08G 1/166; G08G 1/0116; G08G 1/164; G08G 1/0141; H04W 4/40
USPC ....................................................... 701/301
See application file for complete search history.

(56) References Cited

U.S. PATENT DOCUMENTS

| | | | |
|---|---|---|---|
| 6,337,637 B1 | 1/2002 | Kubota et al. | |
| 9,142,124 B2* | 9/2015 | Maeda | H04W 4/024 |
| 9,449,506 B1* | 9/2016 | Whiting | G06T 7/215 |
| 9,922,564 B2* | 3/2018 | Bai | B60K 35/00 |
| 10,510,257 B2* | 12/2019 | Fang | G06K 9/00369 |
| 10,688,662 B2* | 6/2020 | Hager, IV | G05D 1/0219 |
| 10,771,921 B2* | 9/2020 | Ueno | H04W 4/025 |
| 2018/0122240 A1 | 5/2018 | Shirosaki et al. | |

FOREIGN PATENT DOCUMENTS

| | | |
|---|---|---|
| JP | 2001126193 | 5/2001 |
| JP | 2016225723 | 12/2016 |

* cited by examiner

*Primary Examiner* — John A Tweel, Jr.
(74) *Attorney, Agent, or Firm* — Chip Law Group

(57) ABSTRACT

A movable body monitoring apparatus is mounted on a movable body and to receive movement data related to movements of other movable bodies. The apparatus includes an acquiring unit, a generator, a determining unit, and a monitoring unit. The acquiring unit acquires the movement data on the other movable bodies. The generator generates group information on a plurality of low-speed movable bodies which are determined based on actual speeds or types of the other movable bodies. The determining unit determines whether to generate the group information by the generator, in accordance with a travel environment. The monitoring unit collectively monitors movements of the plurality of low-speed movable bodies using the group information, when the group information is generated. The monitoring unit individually monitors the movements of the plurality of low-speed movable bodies, when the group information is not generated.

13 Claims, 7 Drawing Sheets

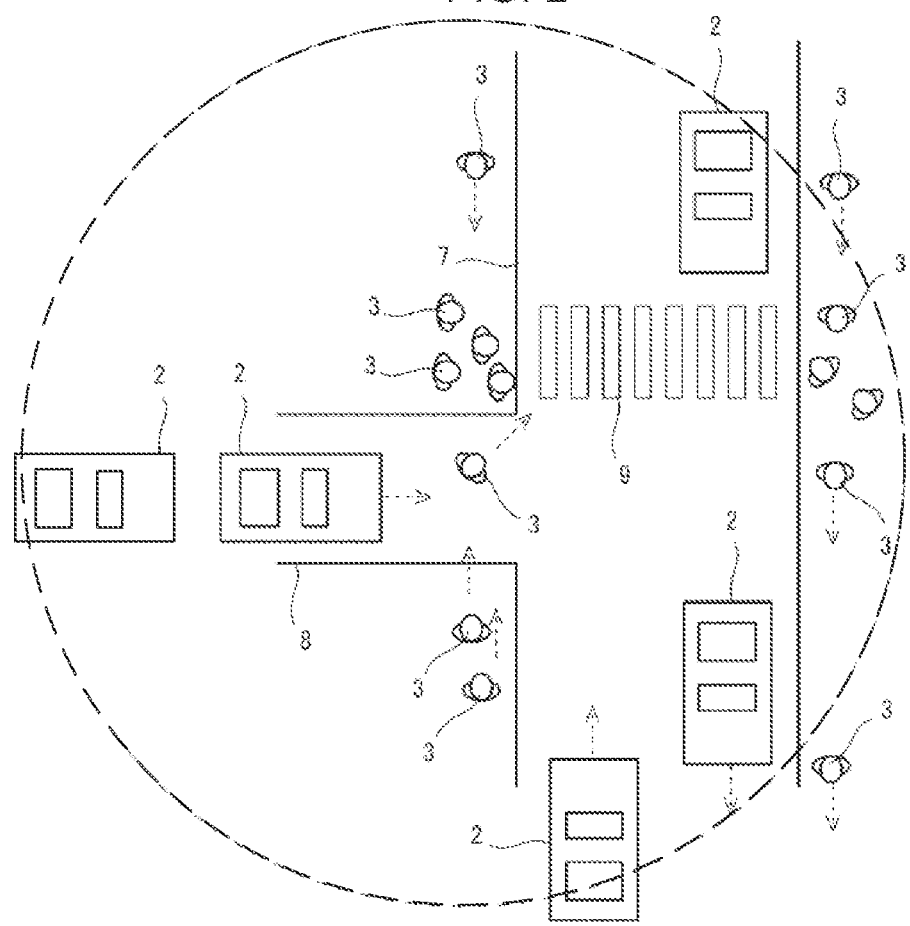

FIG. 3A
FIG. 3B
FIG. 3C
FIG. 3D
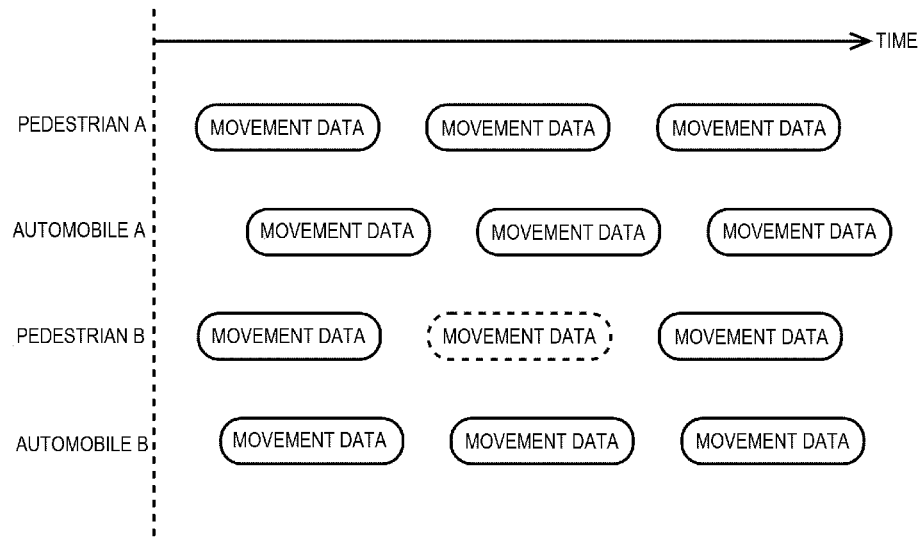
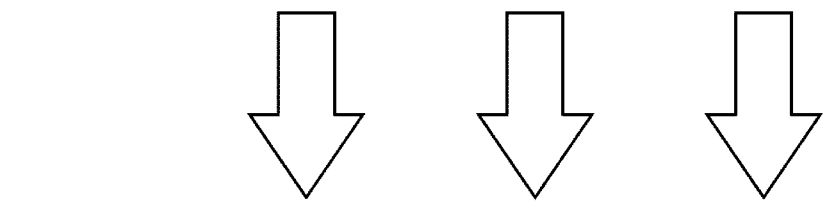
FIG. 3E
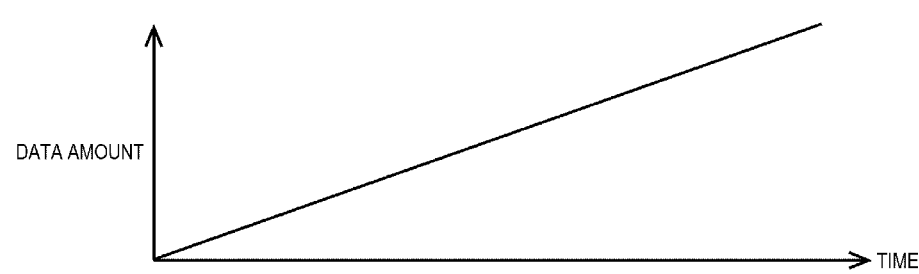

MOVABLE BODY MONITORING APPARATUS, AND VEHICLE CONTROL SYSTEM AND TRAFFIC SYSTEM USING THE MOVABLE BODY MONITORING APPARATUS

CROSS-REFERENCE TO RELATED APPLICATIONS

The present application claims priority from Japanese Patent Application No. 2018-181317 filed on Sep. 27, 2018, the entire contents of which are hereby incorporated by reference.

BACKGROUND

The disclosure relates to a movable body monitoring apparatus, and a vehicle control system and a traffic system using the movable body monitoring apparatus.

In recent years, as for vehicles such as automobiles on which persons get when moving, it has been considered to assist or automatically control the travel of the vehicles and the operation of devices that are used in the vehicles. Moreover, in order to improve, for example, the safety, the smoothness, the movement cost, the comfortableness, and the environmental friendliness of vehicles when moving, it is desirable to control the vehicles, not only based on information separately detected by each vehicle, but also using complex information obtained by widely acquiring and collecting information related to movements of other movable bodies such as the other vehicles except the host vehicle and pedestrians, and information on a travel environment.

Traffic systems available for this purpose include, for example, an intelligent transport system (ITS), a cooperative ITS, universal traffic management systems (UTMS), an advanced rapid transit (ART), and a public transportation priority system (PTPS), and the study and the development of these systems have been progressed. Moreover, as for the cooperative ITS, the standard TC204/WG18 is formulated.

SUMMARY

An aspect of the disclosure provides a movable body monitoring apparatus configured to be mounted on a movable body and receive movement data related to movements of other movable bodies. The movable body monitoring apparatus includes an acquiring unit, a generator, a determining unit, and a monitoring unit. The acquiring unit is configured to acquire the movement data on the other movable bodies. The generator is configured to generate group information on a plurality of low-speed movable bodies which are determined on a basis of actual speeds or types of the other movable bodies. The determining unit is configured to determine whether to generate the group information by the generator, in accordance with a travel environment. The monitoring unit is configured to collectively monitor movements of the plurality of low-speed movable bodies using the group information, when the group information is generated. The monitoring unit is configured to individually monitor the movements of the plurality of low-speed movable bodies, when the group information is not generated.

An aspect of the disclosure provides a vehicle control system including the movable body monitoring apparatus, and a vehicle control apparatus configured to control a vehicle on a basis of the monitoring by the movable body monitoring apparatus.

An aspect of the disclosure provides a traffic system including the movable body monitoring apparatus, and a server apparatus configured to transmit and receive movement data related to the movements of the movable bodies to and from the movable body monitoring apparatus.

An aspect of the disclosure provides a movable body monitoring apparatus configured to be mounted on a movable body and receive movement data related to movements of other movable bodies. The movable body monitoring apparatus includes circuitry. The circuitry is configured to acquire the movement data on the other movable bodies. The circuitry is configured to generate group information on a plurality of low-speed movable bodies which are determined on a basis of actual speeds or types of the other movable bodies. The circuitry is configured to determine whether to generate the group information by the generator, in accordance with a travel environment. The circuitry is configured to collectively monitor movements of the plurality of low-speed movable bodies using the group information, when the group information is generated. The circuitry is configured to individually monitor the movements of the plurality of low-speed movable bodies, when the group information is not generated.

BRIEF DESCRIPTION OF THE DRAWINGS

FIG. 2 is an explanatory diagram illustrating an example in which vehicles and pedestrians are moving as a plurality of movable bodies.

FIG. 3A to FIG. 3E are explanatory diagrams illustrating a correspondence relationship between generation status of movement data related to the movements of the plurality of movable bodies and the amount of data stored in a memory.

DETAILED DESCRIPTION

Hereinafter, an embodiment of the disclosure will be described with reference to the accompanying drawings.

Consider a situation in which information on movable bodies and the like can be actually transmitted and received. In this case, vehicles such as automobiles that collect and process the information would be to acquire data on a large amount of information and to use the data for control of the vehicles.

However, vehicles of related art such as automobiles have received and processed, not movement data on individual movable bodies, but (i) congestion data into which the movement data are collectively abstracted and (ii) partial map data for guiding a path, in an area including the host vehicle position.

Even if a technology enables the vehicles of the related art such as automobiles to widely collect information on movable bodies, the vehicles are not configured to appropriately acquire movement data on a large number of movable bodies widely collected or control the travel of the vehicles based on the acquired movement data.

Japanese Unexamined Patent Application Publication (JP-A) No. 2001-126193 and JP-A No. 2016-225723 disclose techniques of grouping pedestrians in accordance with travel directions of the pedestrians and monitoring the pedestrians. These techniques are considered to reduce a monitoring load, compared with a case in which a plurality of pedestrians are individually monitored.

However, even when the pedestrians are grouped and monitored, a pedestrian who acts differently from the other pedestrians can be present. Moreover, some situations can be not suitable for monitoring with grouping. In this case, as in JP-A No. 2001-126193, such a situation can be assumed that monitoring with grouping does not provide excellent monitoring. Moreover, inappropriate monitoring makes the appropriate control of travel of the vehicle based on the monitoring result, difficult.

It is desirable for a vehicle such as an automobile to appropriately monitor a plurality of movable bodies based on the movement data on the plurality of movable bodies that can be collected.

Figure 1:
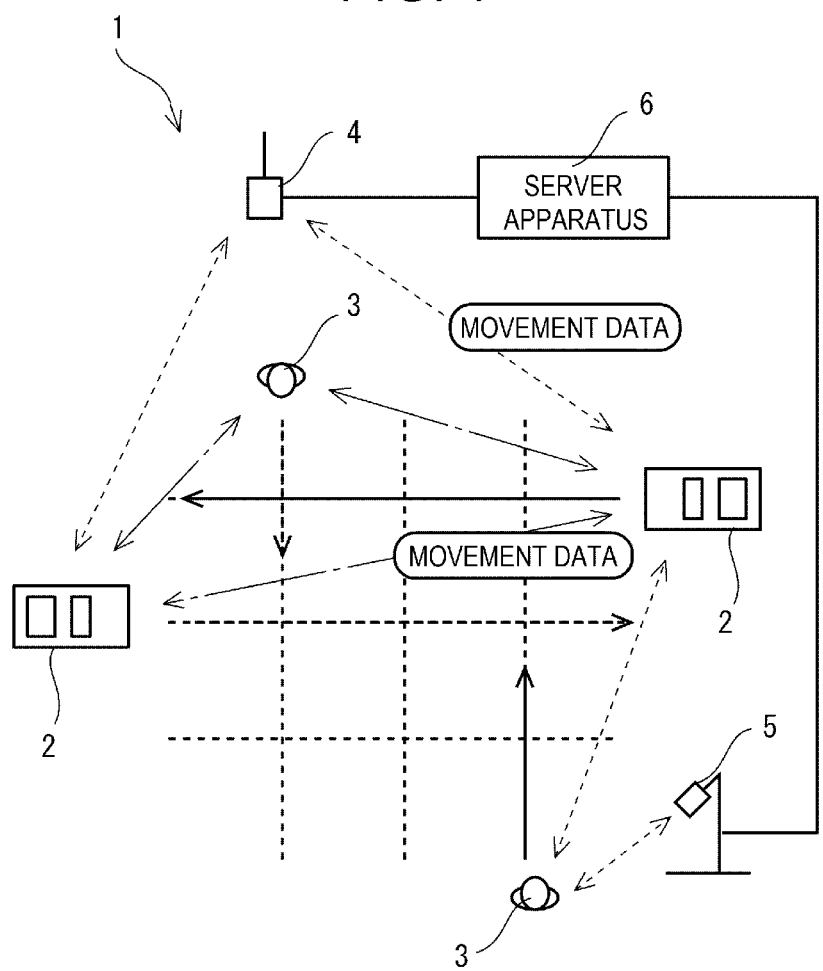
FIG. 1 is a schematic explanatory diagram illustrating an example of a traffic system according to an embodiment of the disclosure.

FIG. 1 is a schematic explanatory diagram illustrating an example of a traffic system 1 according to the embodiment of the disclosure.

FIG. 1 illustrates a plurality of vehicles 2 serving as a plurality of movable bodies, a plurality of pedestrians 3 serving as low-speed movable bodies. In the vehicles 2 such as automobiles on which persons get when moving, assisting or automatically controlling the travel of the vehicles 2 and the operation of devices that are used in the vehicles 2 have become available. In addition to an automobile or an electric vehicle on which a plurality of persons can get, examples of the vehicles 2 include a motor cycle, a personal mobility aid, a cart, and an electric wheelchair.

The traffic system 1 in FIG. 1 includes a plurality of vehicle communication devices, a plurality of pedestrian communication devices, a base station 4, a beacon apparatus 5, and a server apparatus 6. The plurality of vehicle communication devices are respectively provided to the vehicles 2 such as automobiles. The plurality of pedestrian communication devices are respectively carried by the low-speed movable bodies such as the pedestrians 3. FIG. 1 illustrates the vehicles 2 in place of the vehicle communication devices and the pedestrians 3 in place of the pedestrian communication device. The traffic system 1 may use a base station of a commercial wireless communication and a communication device that is disposed on a road shoulder of a highway, as the base station 4.

In the traffic system 1 in FIG. 1, the communication device of each of the vehicles 2 and the pedestrians 3 transmits movement data related to a movement itself as a movable body to the server apparatus 6 via the base station 4 or the beacon apparatus 5. The server apparatus 6 collects the movement data related to the movements of the plurality of movable bodies, generates data on traffic information as necessary based on the collected movement data, and transmits the movement data and the data on the traffic information to the communication devices. The server apparatus 6 transmits and receives the movement data related to the movements of the movable bodies, to and from the vehicle communication devices.

In the traffic system 1 in FIG. 1, the communication device of each of the vehicles 2 and the pedestrians 3 transmits the movement data related to the movement itself as a movable body to another communication device that is in the vicinity thereof.

Upon receipt of the movement data and the like from the server apparatus 6 or a communication device of another movable body, each communication device stores and uses the movement data and the like for control of the movement itself.

For example, in FIG. 1, the right-hand vehicle 2 travels straight leftward. The left-hand vehicle 2 in FIG. 1 travels straight rightward. The right-hand vehicle 2 and the left-hand vehicle 2 in FIG. 1 pass each other on a bidirectional road, for example.

The lower-right-hand pedestrian 3 in FIG. 1 travels straight upward. Before the lower-right-hand pedestrian 3 with a low movement speed reaches an intersecting position of courses of the right-hand vehicle 2 and the left-hand vehicle 2 in FIG. 1, the right-hand vehicle 2 and the left-hand vehicle 2 have passed the intersecting position.

In contrast, the upper-left-hand pedestrian 3 in FIG. 1 travels straight downward. Accordingly, there is a possibility that before and after the timing when the upper-left-hand pedestrian 3 reaches an intersecting position, the left-hand vehicle 2 in FIG. 1 may reach the intersecting position.

In this case, the vehicle communication device mounted on the right-hand vehicle 2 in FIG. 1 accelerates or decelerates the movement speed of the host vehicle so that the right-hand vehicle 2 does not pass through the intersecting position simultaneously with the upper-left-hand pedestrian 3, based on pre-received movement data related to the movement of the upper-left-hand pedestrian 3.

It is expected that the traffic system 1 transmits and receives movement data related to movements of a plurality of movable bodies to and from the plurality of the movable bodies to allow the plurality of the movable bodies to move in safety.

For example, the vehicle 2 can control the vehicle 2 not only based on information detected by the vehicle 2 itself, but also using complex information obtained by widely acquiring and collecting (i) information related to movements of other movable bodies, such as other vehicles than the host vehicle, and the pedestrians 3, and (ii) information on an travel environment.

Transmitting and receiving the movement data among the plurality of movable bodies using the traffic system 1 in this manner can improve the safety, the smoothness, the movement cost, the comfortableness, and the environmental friendliness of the movements of the movable bodies.

The traffic system 1 available for such a case includes, for example, an intelligent transport system (ITS), a cooperative ITS, universal traffic management systems (UTMS), an advanced rapid transit (ART), and a public transportation priority system (PTPS). The cooperative ITS is standardized by the standard TC204/WG18.

FIG. 2 is an explanatory diagram illustrating an example in which the vehicles 2 and the pedestrians 3 are moving as a plurality of movable bodies.

FIG. 2 illustrates a main road 7 that extends in the vertical direction, and an alley 8 that extends in the left direction from the main road 7. The vehicles 2 such as automobiles move on central portions of the main road 7 and the alley 8. The pedestrians 3 move on side portions of the main road 7 and the alley 8. Moreover, the pedestrians 3 stop before a pedestrian crossing 9 on a red signal, and cross the main road 7 on the pedestrian crossing 9 when the signal turns to green. FIG. 2 illustrates a large number of the pedestrians 3 and a large number of the vehicles 2.

In order to achieve the above-mentioned object of the traffic system 1, the vehicle 2 that travels on the main road 7 from the lower part to the upper part in FIG. 2 in such a travel environment, for example, is cautious about not only another vehicle 2 such as an oncoming vehicle that travels on the same main road 7, but also a large number of pedestrians 3 that walk on the road side stripe near the vehicle 2, the pedestrian 3 and the vehicle 2 that appear from the alley 8, and travels by finely adjusting a course thereof so as not to come into contact, such as collision, with these.

Accordingly, the vehicle 2 is to instantaneously acquire movement data having information, such as the positions and the speed of a large number of other movable bodies that are present in the surrounding thereof. This enables the vehicle 2, when passing by another movable body, to adjust the course so as not to come into contact with the other movable body.

Each movable body is to continuously acquire the latest movement data on a large number of other movable bodies that are present in the surrounding of the movable body itself. For example, the vehicle 2 that is located at the head on the alley 8 is to continuously acquire the latest movement data on a large number of other movable bodies that are in an area surrounded by a circular dashed line.

Moreover, each movable body is unable to limit the number of other movable bodies that are present in the surrounding thereof by the movable body itself.

FIG. 3A to FIG. 3E are explanatory diagrams illustrating a correspondence relationship between a generation status of movement data related to movements of a plurality of movable bodies and the amount of data stored in a memory 18.

FIG. 3A illustrates plural pieces of movement data on a pedestrian A.

FIG. 3B illustrates plural pieces of movement data on a vehicle A.

FIG. 3C illustrates plural pieces of movement data on a pedestrian B.

FIG. 3D illustrates plural pieces of movement data on a vehicle B.

In FIG. 3A to FIG. 3D, the plural pieces of movement data are generated in order from the left side to the right side.

FIG. 3E illustrates a time change graph illustrating the total data amount of the movement data from FIG. 3A to FIG. 3D.

As illustrated in the graph in FIG. 3E, the total data amount of the movement data proportionally increases in accordance with the elapse of time. Moreover, the increase ratio of the total data amount becomes larger as the number of movable bodies increases more.

In order to achieve the object of the traffic system 1, as illustrated in FIG. 3A to FIG. 3D, each movable body repeatedly transmits movement data having information, such as the latest position and speed thereof, at as short intervals as possible.

As a result, as illustrated in FIG. 3E, the total data amount of the movement data that are transmitted and received among the plurality of the movable bodies dramatically increases in accordance with the number of movable bodies to be collected and the elapsed time from when the collection is started. The amount of data stored in the memory by each movable body in order to monitor the movements of the other movable bodies also increases in the same tendency.

As in the foregoing, in order to achieve the object of the traffic system 1, the communication device in each movable body that is provided to the vehicle 2 or the like and acquires and collects the movement data is to appropriately collect such a large number of movement data and use the large number of movement data for control of a movement thereof.

The vehicle 2 such as an automobile has no experience of having treated such a large number of data.

However, a vehicle 2 of related art such as an automobile simply has a data processing ability of processing data detected by the host vehicle, and receiving and processing static congestion data into which movements of individual movable bodies are collectively abstracted and partial map data for guiding a path, in an area including the host vehicle position.

In other words, even if a technology enables current vehicles to widely collect information on movable bodies, the current vehicles cannot appropriately acquire widely collected dynamic movement data on a large number of the movable bodies or control the travel and the like of the vehicles based on the acquired dynamic movement data.

Moreover, even if the current vehicle has such a processing ability, there is a possibility that the vehicle cannot move forward at all or that an unnecessarily and excessively reacted movement of the vehicle occurs.

Therefore, it is desired that the communication device of the vehicle 2 can excellently acquire a large amount of movement data on a plurality of movable bodies that may be acquired from the traffic system 1, and excellently control the travel and the like of the vehicle 2 based on the acquired movement data.

Hereinafter, measures taken in the embodiment will be described.

Figure 4:
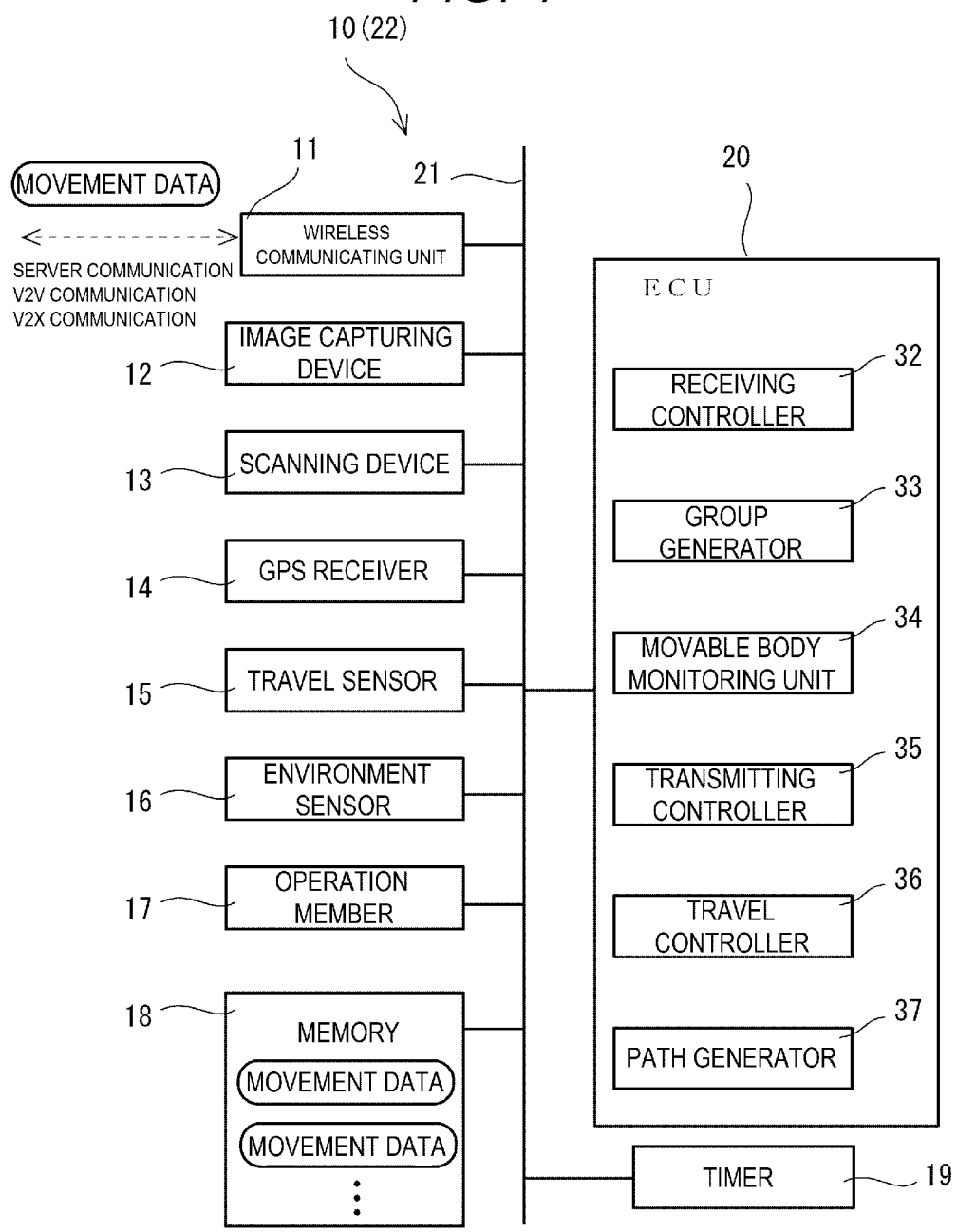
FIG. 4 is an explanatory diagram illustrating an example of a vehicle control system that is provided with a vehicle communication device according to the embodiment of the disclosure.

FIG. 4 is an explanatory diagram illustrating a vehicle control system 10 that is provided with a vehicle communication device according to the embodiment of the disclosure.

The vehicle control system 10 in FIG. 4 is provided to the vehicle 2 as a movable body, and controls the travel and the like of the vehicle 2.

The vehicle control system 10 in FIG. 4 includes a wireless communicating unit 11, an image capturing device 12, a scanning device 13, a GPS receiver 14, a travel sensor 15, an environment sensor 16, an operation member 17, the memory 18, a timer 19, an electronic control unit (ECU) 20, and an in-vehicle network 21 that couples these units. A one-chip microcomputer may include the memory 18, the timer 19, and the like, in addition to the ECU 20. This one-chip microcomputer may be coupled to the in-vehicle network 21.

In FIG. 4, a vehicle communication device 22 may be configured with, for example, the wireless communicating unit 11, the memory 18, the timer 19, and the ECU 20.

The in-vehicle network 21 is a network that couples devices that are provided to the respective units of the vehicle 2, in the vehicle 2 such as an automobile. The in-vehicle network 21 may be a controller area network (CAN), a local interconnect network (LIN), or Ethernet, for example. Moreover, the in-vehicle network 21 may include a relay device, and a plurality of communication cables that are coupled to the relay device. In this case, the devices that are provided to the respective units of the vehicle 2 may be distributed and coupled to the plurality of the communication cables. The devices that are provided to the respective units of the vehicle 2 transmit and receive data to and from other devices via the in-vehicle network 21.

The image capturing device 12 captures an image of an inside or a surrounding of the vehicle 2. The vehicle 2 compatible with the traffic system 1 may be provided with the image capturing device 12 that captures at least an image ahead of the vehicle 2. In this case, the vehicle 2 acquires a captured image of another vehicle or the like that is travelling ahead of the vehicle 2.

The scanning device 13 scans another movable body and a fixed installed object that are present in the surrounding of the vehicle 2, by a radar or the like. This enables the vehicle 2 to detect distances or the like to the other movable body and the fixed installed object that are present in the surrounding of the vehicle 2.

The GPS receiver 14 receives radio waves from a GPS satellite, and generates current position information on the vehicle 2. The GPS receiver 14 may receive radio waves from the base station 4 and a radio tower that are fixedly disposed on the ground, and generate or correct the current position information on the vehicle 2. The vehicle 2 may generate the current position information on the vehicle 2 based on radio waves from the base station 4 that are received by the wireless communicating unit 11, for example, different from the GPS receiver 14, or based on detection about the travel of the vehicle 2.

The travel sensor 15 detects information related to actual travel of the vehicle 2. The information related to the actual travel of the vehicle 2 includes, for example, a speed and a movement direction of the vehicle 2. The information related to the actual travel of the vehicle 2 may further include, for example, an operating state of a drive source, an operating state of a transmission, an operating state of a braking device, and a steering state of the vehicle 2.

The environment sensor 16 detects an actual environment at a position where the vehicle 2 is present. Information on the actual environment includes, for example, a state of sunshine, a state of rain, a type of road surface, the temperature, and the humidity.

The operation member 17 is a member with which an occupant riding on the vehicle 2 operates the travel and the like of the vehicle 2. The operation member 17 includes, for example, a steering wheel, an accelerator pedal, a brake pedal, a shift lever, a wiper switch, a turn signal lever, a start button, and an operation mode switching button. When the occupant operates the operation member 17, the operation member 17 generates information on the operation, and outputs the information.

The timer 19 measures a time duration or a time, and outputs the time duration or the time.

The wireless communicating unit 11 may simply transmit and receive communication data of the traffic system 1. The wireless communicating unit 11 performs communication with the base station 4 and the beacon apparatus 5, for example, which are used in the traffic system 1, and performs vehicle-to-vehicle (V2V) communication or V2X communication with the communication devices, which are used in the other movable bodies. The wireless communicating unit 11 may perform communication with one base station 4 or one beacon apparatus 5 that performs communication in a zone designated by the traffic system 1. In this case, when the vehicle 2 moves over the zone, the traffic system 1 designates one base station 4 or one beacon apparatus 5 that corresponds to anew zone as a destination of a wireless data communication. This enables the wireless communicating unit 11 to transmit and receive the movement data or the like to and from the server apparatus 6 of the traffic system 1 even when the movable body is moving.

Herein, the movement data includes, for example, identification information, attribute information, position information, position detection time information, speed information, and travel direction information on a movable body. The movement data may include, in addition to these, for example, time information corresponding to a generation timing of the movement data, and the like.

The identification information on a movable body may be information for identifying the movable body from other different movable bodies. The identification information on a movable body may be an identification number unique to the movable body, for example. As for the identification number on a movable body, for example, a vehicle body number and a serial number that are assigned to the vehicle 2, a MAC address and an IP address that are assigned to the wireless communicating unit 11, and the like may be used.

The attribute information on a movable body is information indicating the type of the movable body. The types of the movable body include, for example, an automobile, the vehicle 2, the pedestrian 3, a bicycle, a dog, a child, and an elderly person. When the movable body is the vehicle 2, the attribute information may include, for example, information on a manufacturer of the vehicle body, a vehicle type, a model number, a color number, an image of appearance, an exterior option to be made, the type of tires, the type of wheels, a vehicle body number, and the like.

The position information on a movable body may be position information generated by the GPS receiver 14, for example.

The position detection time information on a movable body may be a measurement time by the timer 19 at timing when the GPS receiver 14 receives GPS radio waves, and a measurement time by the timer 19 at timing when the GPS receiver 14 generates position information, for example.

The speed information on a movable body may be an actual speed of the movable body detected by the travel sensor 15, for example.

The travel direction information may be an actual movement direction of the movable body detected by the travel sensor 15, for example.

The movement data may include a part of these information. The plurality of movable bodies in the traffic system 1 may transmit and receive movement data including different information.

The memory 18 records therein (i) various types of programs that are used in the vehicle 2 and (ii) various data that is used during the execution of the programs. The data to be recorded in the memory 18 includes data acquired in the above-mentioned respective units of the vehicle 2. The movement data received by the wireless communicating unit 11 is stored and recorded in the memory 18, for example.

The ECU 20 reads and executes the program recorded in the memory 18. This implements a controller of the vehicle 2. The controller of the vehicle 2 controls the above-mentioned respective units of the vehicle 2.

FIG. 4 illustrates, as functions of the controller of the vehicle 2 that are implemented by the ECU 20, a receiving controller 32, a group generator 33, a movable body monitoring unit 34, a transmitting controller 35, a travel controller 36, and a path generator 37.

The receiving controller 32 acquires reception data on another movable body from the wireless communicating unit 11 and processes the reception data on the other movable body. When the reception data is movement data on another movable body, for example, the receiving controller 32 records the acquired movement data on the other movable body in the memory 18. This stores and records plural pieces of the acquired movement data in the memory 18.

The group generator 33 generates group information on the plurality of other movable bodies stored and recorded in the memory 18, and records the generated group information in the memory 18.

The movable body monitoring unit 34 monitors movements of a plurality of other movable bodies, based on the information on the plurality of other movable bodies stored and recorded in the memory 18. The movable body monitoring unit 34 monitors an influence on the course (travel) of the host vehicle, caused by the movement of another movable body, for example.

The movable body monitoring unit 34 predicts courses of the other movable bodies that are present within a monitoring area including the host vehicle and the course, for example, and sets a monitoring level for each of the other movable bodies based on a determination as to an intersection with the course of the host vehicle.

The monitoring level for each of the other movable bodies may be classified into, for example, a high level when the course of another movable body intersects with the course of the host vehicle, a middle level when the course of another movable body approaches the course of the host vehicle, and a low level when the course of another movable body is distant from the course of the host vehicle.

The transmitting controller 35 causes the wireless communicating unit 11 to transmit part or all of the movement data on the plurality of other movable bodies that are stored and recorded in the memory 18.

The path generator 37 generates a movement path along which a movable body moves to a destination, and records information on the generated movement path in the memory 18.

The travel controller 36 controls the travel of the vehicle 2 by self-driving or driving assist. The travel controller 36 adjusts the course of the vehicle 2 in accordance with the operation of the operation member 17 by the occupant, the movement path recorded in the memory 18, the movement data on the plurality of other movable bodies recorded in the memory 18, the monitoring result by the movable body monitoring unit 34, and the like, and controls the travel of the vehicle 2, for example.

For example, the travel controller 36 determines a short-term course based on the amount of operation of the operation member 17 and the movement path, and adjusts the course of the vehicle 2 so as to prevent the short-term course from intersecting with or approaching a course of another movable body. Moreover, the travel controller 36 controls the travel of the vehicle 2 so as to cause the vehicle 2 to move along the generated course.

Figure 5:
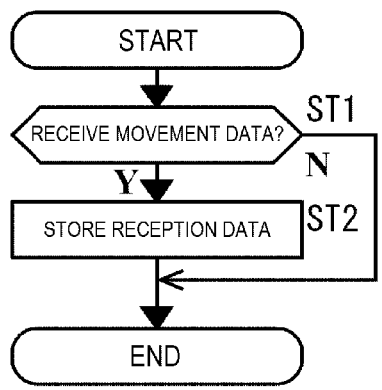
FIG. 5 is an explanatory diagram illustrating an example of processing of a receiving controller in FIG. 4.

FIG. 5 is an explanatory diagram illustrating an example of processing of the receiving controller 32 in FIG. 4.

For example, when the wireless communicating unit 11 receives new movement data, the receiving controller 32 may conduct reception processing in FIG. 5 repeatedly or at periodic timing.

At a step ST1 in the reception processing in FIG. 5, the receiving controller 32 determines whether the wireless communicating unit 11 has received movement data.

The receiving controller 32 may determine not only whether the wireless communicating unit 11 receives movement data on individual movable bodies but also whether the wireless communicating unit 11 receives movement data on a group of a plurality of movable bodies. Moreover, the receiving controller 32 may simply receive movement data on a group corresponding to a plurality of movable bodies, but may not receive movement data on individual movable bodies, and may make a determination, in some cases.

If the wireless communicating unit 11 has not received movement data, the receiving controller 32 ends the reception processing in FIG. 5.

If the wireless communicating unit 11 has received movement data, the receiving controller 32 acquires and stores the movement data in the memory 18, at a step ST2. Thereafter, the receiving controller 32 ends the reception processing in FIG. 5.

The processing in the foregoing is repeated to store plural pieces of movement data on the respective other movable bodies at different times acquired by the receiving controller 32, in the memory 18.

When storing new movement data in the memory 18, the receiving controller 32 may delete old and unnecessary data in the memory 18. This prevents the amount of data stored in the memory 18 from continuously increasing with time. It is possible to appropriately store the movement data on a plurality of other movable bodies using the memory 18 having a limited storage capacity.

Figure 6:
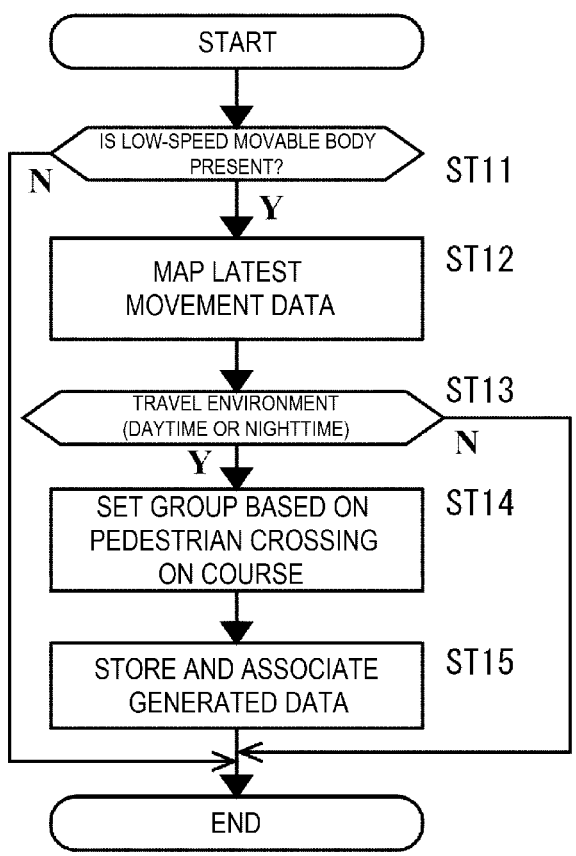
FIG. 6 is an explanatory diagram illustrating an example of processing of a group generator in FIG. 4.

FIG. 6 is an explanatory diagram illustrating an example of processing of the group generator 33 in FIG. 4.

The group generator 33 may repeatedly conduct grouping processing in FIG. 6 when new movement data is received and stored in the memory 18, for example, or at periodic timing.

At a step ST11 of the grouping processing in FIG. 6, the group generator 33 reads the plural pieces of movement data stored in the memory 18, and determines whether a low-speed movable body is present.

For example, the group generator 33 determines that a low-speed movable body is present when the attribute information in the plural pieces of movement data stored in the memory 18 indicates the pedestrian 3, a bicycle, a dog, a child, or an elderly person.

Alternatively, for example, the group generator 33 determines that a low-speed movable body is present when actual speed information in the movement data indicates a speed equal to or lower than a predetermined speed.

At a step ST12, the group generator 33 reads the latest movement data on a plurality of low-speed movable bodies or movable bodies movement data of which has been stored in the memory 18, and maps the low-speed movable bodies or the movable bodies on a local map of an area including the host vehicle. When the latest movement data read from the memory 18 is old data, the group generator 33 predicts positions of the low-speed movable bodies or the movable bodies at the current time from the movement speeds and the movement directions that are obtained based on the movement data, and maps the low-speed movable bodies or the movable bodies the movement data on the predicted position.

At a step ST13, the group generator 33 determines whether to group and monitor the plurality of low-speed movable bodies, based on a travel environment. The group generator 33 determines whether to generate group information, based on the travel environment.

For example, the group generator 33 determines a time period during which vehicles are traveling.

Specifically, the group generator 33 determines whether the current time of the timer 19 is a time period of daytime or a time period of nighttime. The time period of daytime may be, for example, from 6:00 to 18:00. The time period of nighttime may be, for example, from 18:00 to 6:00. The time periods of daytime and nighttime may dynamically vary.

Alternatively, for example, the group generator 33 may determine whether the current time is the time period of daytime or nighttime, in accordance with the presence of sunshine measured by the environment sensor 16.

Accordingly, if the current time is the time period of daytime, the group generator 33 determines that the generation of group information is necessary, and causes the processing to proceed to a step ST14.

If the current time is the time period of nighttime, the group generator 33 determines that the generation of the group information is unnecessary, and ends the grouping processing in FIG. 6 without generating the group information.

The group generator 33 may determine whether to generate the group information based on information other than the time period such as a day of the week, a date, and other statutes, or a travel environment including a combination thereof.

Alternatively, for example, the group generator 33 may determine whether to generate the group information, based on the season such as winter and summer, the weather such as rainy weather and fine weather, or a travel environment including a combination thereof.

For example, a ratio that pedestrians go out in the winter season decreases, compared with that in the summer season and other seasons. Therefore, in the winter season, even in the time period of daytime, for example, the group generator 33 may determine that the generation of group information is unnecessary.

Moreover, in the rainy weather, the ratio that pedestrian go out decreases, compared with that in other weather such as the fine weather. Therefore, in the rainy weather, even in the time period of daytime, for example, the group generator 33 may determine that the generation of group information is unnecessary.

Moreover, the group generator 33 counts the number of pedestrians in the latest path on which the vehicle has traveled until now in order to measure a travel environment. When the counted number of pedestrians is less than a threshold, the group generator 33 may determine that the generation of group information is unnecessary.

At the step ST14, the group generator 33 selects a plurality of low-speed movable bodies that are close to each other, for example, a plurality of low-speed movable bodies that stop near the pedestrian crossing 9, as objects to be grouped. At this time, the group generator 33 may classify the plurality of low-speed movable bodies into types, for selection as objects to be grouped.

The group generator 33 uses movement data on the plurality of low-speed movable bodies selected as objects to be grouped to generate movement data on a group. The group generator 33 may select a plurality of low-speed movable bodies that stop within an area and in the vicinity of the area, as objects to be grouped.

Movement data on a group may include, similarly to movement data on individual movable bodies, identification information, attribute information, position information, position detection time information, speed information, and travel direction information on the group. Movement data on a group of a plurality of pedestrians 3, for example, may include newly issued identification information, attribute information on the pedestrians 3, position information on the center of the group, time information when the group is generated, information related to the speed of the plurality of pedestrians 3, and information on the movement directions of the plurality of pedestrians 3. The group generator 33 generates, based on the information and the like included in the movement data on the plurality of low-speed movable bodies having been selected as objects to be grouped, information on a group thereof.

The group generator 33 may map only low-speed movable bodies that may move so as to intersect with the current position and the course of the host vehicle, for example, on a map, and group, based on a relative positional relationship among the plurality of low-speed movable bodies in the map, a plurality of low-speed movable bodies that are close to one another.

At a step ST15, the group generator 33 stores the generated movement data on the group in the memory 18. The movement data on the group is stored in the memory 18 in association with the plurality of low-speed movable bodies belonging to the group. Identification information on each of the plurality of movable bodies belonging to the group may be added to the movement data on the group.

Thereafter, the group generator 33 ends the grouping processing in FIG. 6.

With the processing in the foregoing, as for a plurality of low-speed movable bodies stored in the memory 18, movement data on a group is stored in the memory 18 for each group of a plurality of low-speed movable bodies that stop in the vicinities of a pedestrian crossing across the course of the host vehicle, for example. Thereafter, when receiving new movement data on the low-speed movable body belonging to the group, the group generator 33 may update information on the movement data on the group based on information on the new movement data. Moreover, when the range of the positions of the plurality of movable bodies belonging to the group expands at a ratio more than a fixed ratio, the group generator 33 may delete movement data on the group in the memory 18. Moreover, when the generated plurality of groups are overlapped, the group generator 33 may integrate these groups into one group.

Figure 7:
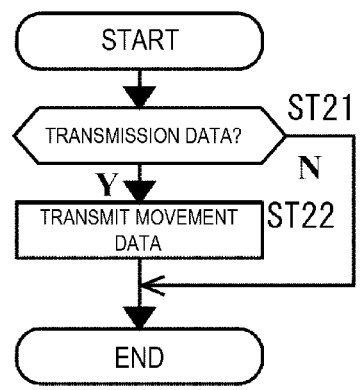
FIG. 7 is an explanatory diagram illustrating an example of processing of a transmitting controller in FIG. 4.

FIG. 7 is an explanatory diagram illustrating an example of processing of the transmitting controller 35 in FIG. 4.

The transmitting controller 35 may repeatedly conduct transmission processing in FIG. 7 when new movement data on the host vehicle is recorded in the memory 18, for example, or at periodic timing.

At a step ST21 in the transmission processing in FIG. 7, the transmitting controller 35 determines whether the movement data stored in the memory 18 includes data to be transmitted.

If the movement data stored in the memory 18 does not include data to be transmitted, the transmitting controller 35 ends the transmission processing in FIG. 7.

If the movement data stored in the memory 18 includes data to be transmitted, at a step ST22, the transmitting controller 35 acquires the data to be transmitted from the memory 18, and outputs and transmits the data to be transmitted to the wireless communicating unit 11. Thereafter, the transmitting controller 35 ends the transmission processing in FIG. 7.

With the processing in the foregoing, the movement data that is stored in the memory 18 is transmitted to the communication devices of the other movable bodies or the vehicle control system 10, as appropriate. Each of the communication devices of the other movable bodies or the vehicle control system 10 stores the movement data transmitted from the host vehicle in the memory 18 thereof, and uses the movement data for control of the movement thereof. When movement data on the host vehicle has been recorded in the memory 18, the transmitting controller 35 may transmit the movement data on the host vehicle with movement data on the other movable bodies, to the communication devices of the other movable bodies or the vehicle control system 10.

Figure 8:
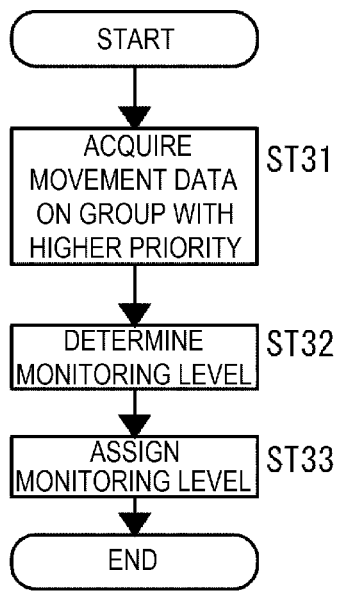
FIG. 8 is an explanatory diagram illustrating an example of processing of a movable body monitoring unit in FIG. 4.

FIG. 8 is an explanatory diagram illustrating an example of processing of the movable body monitoring unit 34 in FIG. 4.

The movable body monitoring unit 34 may repeatedly conduct monitoring processing in FIG. 8, for example, (i) when a series of movement control by the travel controller 36 has been completed one time, (ii) when new movement data on the host vehicle has been recorded in the memory 18, or (iii) at periodic timing.

At a step ST31 of the monitoring processing in FIG. 8, as for plural pieces of movement data stored in the memory 18, the movable body monitoring unit 34 acquires the movement data on a group with a higher priority than that on individual movable bodies. When plural pieces of movement data on each movable body or each group at different times has been stored in the memory 18, the movable body monitoring unit 34 acquires the plural pieces of movement data.

At a step ST32, the movable body monitoring unit 34 predicts and determines, using the acquired movement data, (i) whether the movement of another movable body corresponding to the movement data influences the movement of the host vehicle and (ii) a degree of influence, and determines the monitoring level in accordance with the result of the prediction determination.

When the movable body monitoring unit 34 has acquired movement data on a group, the movable body monitoring unit 34 moves, for example, a low-speed movable body that protrudes most in a lane direction among a plurality of low-speed movable bodies belonging to the group, at the highest movement speed in the lane direction among the plurality of low-speed movable bodies belonging to the group. The movable body monitoring unit 34 then determines whether there is a possibility that another movable body intersects with or approaches the course of the host vehicle. Moreover, the movable body monitoring unit 34 may calculate an arrival time of the other movable body to the intersecting position and the approaching position or an arrival time of the host vehicle to the intersecting position or the approaching position, and may determine whether there is a possibility that the other movable body intersects with or approaches the course of the host vehicle by considering a time difference therebetween.

When the movable body monitoring unit 34 has acquired individual movement data on another movable body, the movable body monitoring unit 34 predicts a course of the other movable body, for example, from the movement data, and determines whether there is a possibility that the other movable body intersects with or approaches the course of the host vehicle. Moreover, the movable body monitoring unit 34 may calculate an arrival time of the other movable body to the intersecting position and the approaching position or an arrival time of the host vehicle to the intersecting position or the approaching position, and may determine whether there is a possibility that the other movable body intersects with or approaches the course of the host vehicle by considering a time difference therebetween.

At a step ST33, the movable body monitoring unit 34 assigns a monitoring level to the other movable body based on (i) whether the movement of the other movable body influences the movement of the host vehicle and (ii) the degree of influence.

The monitoring level to be assigned to the other movable body may be, for example, a high level when the course of the other movable body intersects with the course of the host vehicle, a middle level when the course of the other movable body approaches the course of the host vehicle, and a low level when the course of the other movable body neither intersects with nor approaches the course of the host vehicle.

Repeating the processing in the foregoing enables the movable body monitoring unit 34 to continuously monitor another movable body in accordance with an every-changing movement situation of the other movable body. Moreover, the movable body monitoring unit 34 may classify a plurality of other movable bodies according to the monitoring level.

When the movable body monitoring unit 34 has acquired movement data on a group, the movable body monitoring unit 34 may monitor movements of a plurality of low-speed movable bodies belonging to the group based on a movement of a multiple-order curve generated by integrating the movements of the plurality of low-speed movable bodies belonging to the group.

Moreover, when the movable body monitoring unit 34 has acquired movement data on an individual low-speed movable body, the movable body monitoring unit 34 may monitor the low-speed movable body based on an individual movement of the low-speed movable body.

Figure 9:
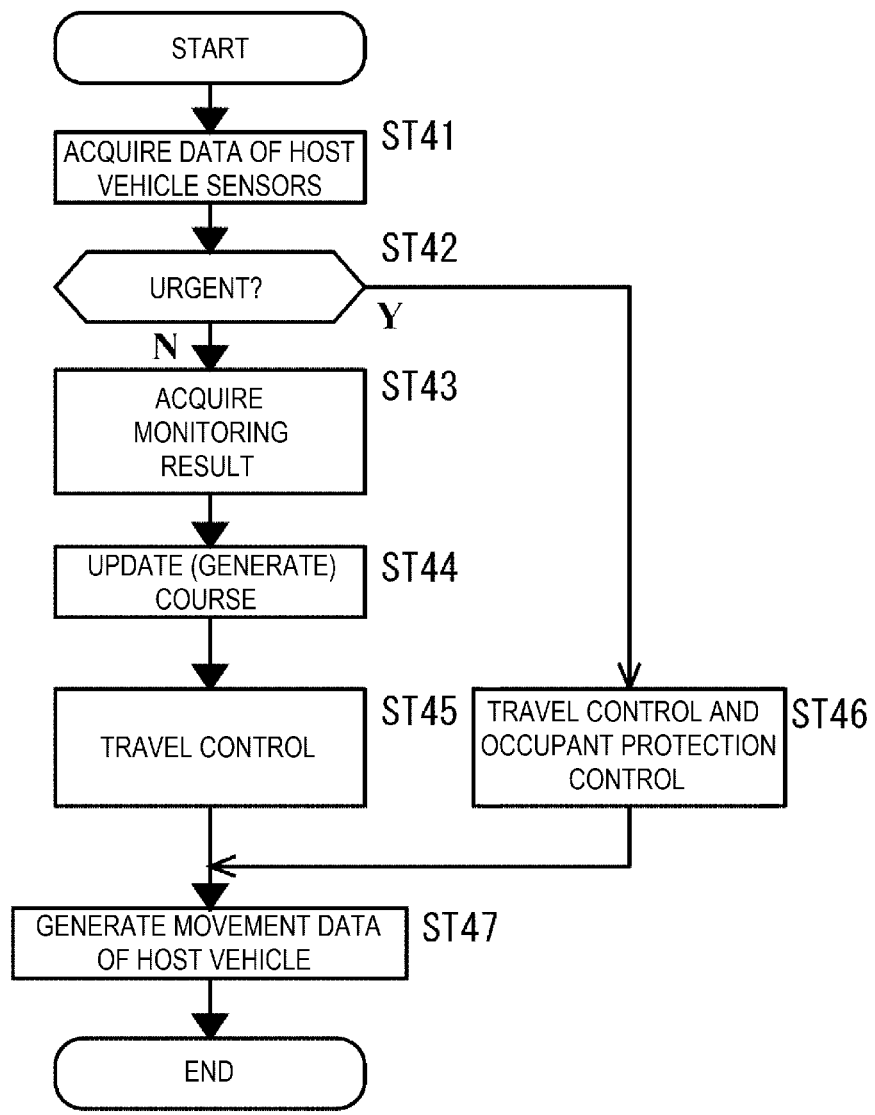
FIG. 9 is an explanatory diagram illustrating an example of processing of a travel controller serving as a vehicle control apparatus in FIG. 4.

FIG. 9 is an explanatory diagram illustrating an example of processing of the travel controller 36 in FIG. 4. In one embodiment, the travel controller 36 may serve as a "vehicle control apparatus".

The travel controller 36 may repeatedly conduct traveling processing in FIG. 9, for example, (i) when a previous-time series of the movement control by the travel controller 36 has completed, (ii) when new movement data on the host vehicle has been recorded in the memory 18 or (iii) at periodic timing.

At a step ST41 of the travel processing in FIG. 9, the travel controller 36 acquires detection data and the like of various host vehicle sensors that are provided to the vehicle 2.

At a step ST42, the travel controller 36 determines whether a travel state of the host vehicle is in an urgent state based on the detection data of the host vehicle sensors. For example, when detecting running out of the pedestrian 3 or another vehicle into a roadway in an image ahead of the vehicle 2 captured by the image capturing device 12, the travel controller 36 determines that the travel state of the host vehicle is the urgent state.

When the travel state of the host vehicle is the urgent state, the travel controller 36 causes the processing to proceed to a step ST46. At the step ST46, the travel controller 36 executes travel control of the vehicle 2 to deal with the urgent situation and occupant protection control. The travel controller 36 executes, for example, avoid control to instantly brake the vehicle 2 to be stopped suddenly. Moreover, when the travel sensor 15 detects the high acceleration after having started the control of the sudden stop, the travel controller 36 executes the occupant protection control using a seatbelt and an airbag. In the urgent travel control, the travel controller 36 may transmit movement data on the host vehicle indicating the urgency from the wireless communicating unit 11 to other movable bodies. This enables the other movable bodies to start urgent travel control following the urgent travel control of the host vehicle. The travel controller 36 of the host vehicle also determines whether the wireless communicating unit 11 has received movement data indicating the urgency from another movable body at the step ST42. When the travel controller 36 of the host vehicle has received such movement data, the travel controller 36 may cause the processing to proceed to the step ST46.

When the travel state of the host vehicle is not the urgent state, the travel controller 36 causes the processing to proceed to a step ST43. At the step ST43, the travel controller 36 acquires the monitoring result by the movable body monitoring unit 34.

At a step ST44, the travel controller 36 generates or adjusts a course of the vehicle 2 in accordance with the monitoring results about the movements of the plurality of movable bodies by the movable body monitoring unit 34, and updates the course.

The travel controller 36 generates a course during a movement control period this time of the vehicle 2, for example, based on the movement path generated by the path generator 37. For example, the travel controller 36 generates a course in which the vehicle travels on a present lane without any change when the vehicle travels straight. The travel controller 36 generates a course in which the vehicle changes the lane for right or left turning and travels when the vehicles turns right or left.

Moreover, the travel controller 36 determines, based on the monitoring result, whether there is another movable body having a possibility of intersecting or approaching the course that is used for the movement control this time of the vehicle 2 during the movement control period this time of the vehicle 2. The travel controller 36 predicts a moving speed and a moving direction of a movable body having a high-level or middle-level monitoring result during the movement control period this time of the vehicle 2, and determines whether the movable body intersect with or approach the course of the host vehicle.

When there is no movable body that intersects with or approaches the course of the host vehicle during the movement control period this time of the vehicle 2, the travel controller 36 adopts the course generated based on the movement path as a course to be used for the control this time and updates the course.

When there is another movable body that intersects with or approaches the course of the host vehicle during the movement control period this time of the vehicle 2, the travel controller 36 updates the course so as to cause the course generated based on the movement path to be apart from the course of the other movable body. Alternatively, the travel controller 36 updates speed information on the course generated based on the movement path so as to allow the vehicle to stop before the intersecting position or the approaching position.

At a step ST45, the travel controller 36 controls the travel of the host vehicle, in accordance with the updated new course, by the control within a range in which the vehicle 2 travels in safety. When the occupant operates the operation member 17 during the control, the travel controller 36 may adjust the course by increasing or decreasing an amount of control relative to an amount of the operation.

At a step ST46, the travel controller 36 generates movement data including new position information and new time information on the host vehicle after the control, and stores the movement data in the memory 18.

Repeating the processing in the foregoing enables the travel controller 36 to continuously control the movement of the host vehicle in accordance with an every-changing movement situation of another movable body. The transmitting controller 35 outputs and transmits the movement data on the host vehicle with the movement data on the different movable body, to the wireless communicating unit 11.

As in the foregoing, in the embodiment, as for low-speed movable bodies that are determined based on the actual speeds or the types of other movable bodies, movement data serving as group information for collectively monitoring a plurality of low-speed movable bodies is generated. At this time, in the embodiment, whether to generate the group information is determined in accordance with the travel environment. Moreover, in the embodiment, when movement data on a group is generated, movements of a plurality of low-speed movable bodies are monitored collectively using the movement data on the group. Also, when the movement data on the group is not generated, the plurality of low-speed movable bodies are monitored individually.

Therefore, in the embodiment, in a case suitable for monitoring movements of a plurality of low-speed movable bodies by grouping, for example, during the daytime, the movements of the plurality of low-speed movable bodies are grouped and collectively monitored on the group basis using the movement data of the group. Moreover, in the embodiment, in a case not suitable for monitoring movements of a plurality of low-speed movable bodies by grouping, for example, during the nighttime, the movements of the plurality of low-speed movable bodies are monitored individually without generating movement data on a group. In the embodiment, it is possible to control the travel and the like of the vehicle based on the respective monitoring results.

Even when a large number of persons are present at an intersection during the daytime, for example, in the embodiment, it is possible to collectively and efficiently monitor the large number of the pedestrians 3 with a low load, and control the travel of the vehicle in accordance with the monitoring.

Moreover, less persons are present at the intersection during nighttime than during the daytime in many cases, and there is a higher possibility that some persons may cross the intersection without following the signal. In the embodiment, it is possible to individually monitor a plurality of persons who are present at the intersection during the nighttime with such a higher possibility, and control the travel of the vehicle in accordance with the monitoring.

As in the foregoing, in the embodiment, it is possible to appropriately monitor a plurality of low-speed movable bodies regardless of the number of persons, by switching the way of monitoring in accordance with the travel environment such as the time period when the vehicle is travelling.

The embodiment in the foregoing is a preferred example of the disclosure, but the disclosure is not limited to this. Many modifications and changes may be made to the embodiment without departing from the sprit and scope of the disclosure.

For example, in the above embodiment, the vehicle control system 10 and the communication device which are provided to the movable body use the movable body monitoring unit 34 and the travel controller 36 in order to control the movement of the vehicle 2 based on the movement data stored in the memory 18.

Alternatively, for example, the vehicle control system 10 and the communication device that are provided to the movable body may conduct processing similar to that of the movable body monitoring unit 34 in the processing of the travel controller 36, and simply use the travel controller 36. In this case, the travel controller 36 may conduct processing similar to that of the movable body monitoring unit 34 at the step ST43 in FIG. 9, for example. Moreover, when the movable body monitoring unit 34 is integrated with the travel controller 36, the travel controller 36 may update, without assigning a monitoring level, the course so as to adjust the course, using the monitoring determination result as it is.

In the above embodiment, in the vehicle control system 10 and the communication device that are provided to the movable body, the receiving controller 32 manages movement data to be recorded in the memory.

Alternatively, for example, the vehicle control system 10 and the communication device that are provided to the movable body may be provided with a memory managing unit, independent of the receiving controller 32.

In the above embodiment, the vehicle control system 10 and the communication device that are provided to the movable body includes the travel controller 36 and the transmitting controller 35.

Alternatively, for example, the vehicle control system 10 and the communication device that are provided to the movable body may integrate the transmitting controller 35 with the travel controller 36, and cause the travel controller 36 to conduct the transmission processing of the movement data. In this case, the travel controller 36 may transmit the stored movement data on the host vehicle by the wireless communicating unit 11, after the processing at the step ST47 in FIG. 9, for example.

In the above embodiment, the vehicle control system 10 provided to the vehicle 2 is provided with the respective units illustrated in FIG. 4. Alternatively, for example, the vehicle control system 10 may be provided with a part of the functions in FIG. 4. Moreover, the vehicle control system 10 may be provided with all of the functions in FIG. 4 by the remaining functions in FIG. 4 being provided by a mobile terminal, for example, with respect to the part of the functions in FIG. 4, which are uniquely provided.

Moreover, the vehicle control system 10 may be provided as a part of the functions in FIG. 4, and may conduct the above-mentioned various processing in that state. The vehicle communication device 22 may be provided with apart of the functions in FIG. 4, as the host vehicle sensor to be mounted on the vehicle 2, for example. Specifically, when conducting the control other than the travel in the vehicle 2, the vehicle control system 10 does not need to be provided with all the host vehicle sensors in FIG. 4, the operation member 17, and the path generator 37 of the ECU 20. Even in this case, the vehicle communication device 22 that is provided to the vehicle control system 10 configures the traffic system 1 that transmits and receives movement data and the like to and from the server apparatus 6.

In the above embodiment, the vehicle communication device 22 has been described as apart of the vehicle control system 10. A control system for a low-speed movable body such as the pedestrian 3 and a bicycle may be also provided with functions similar to those of the above-mentioned the vehicle communication device 22. Moreover, the above-mentioned vehicle control system 10 and the vehicle communication device 22 may be also applied to the vehicle 2 of a different type, such as an electric train, other than the vehicle 2.

The invention claimed is:

1. A movable body monitoring apparatus configured to be mounted on a movable body and to receive movement data related to movements of other movable bodies, the movable body monitoring apparatus comprising:
    an acquiring unit configured to acquire the movement data on the other movable bodies;
    a generator configured to:
        generate group information on a plurality of low-speed movable bodies which are determined on a basis of actual speeds or types of the other movable bodies; and
        determine whether to generate the group information, in accordance with a travel environment; and
    a monitoring unit configured to,
        when the group information is generated, collectively monitor movements of the plurality of low-speed movable bodies using the group information, and
        when the group information is not generated, individually monitor the movements of the plurality of low-speed movable bodies.

2. The movable body monitoring apparatus according to claim 1, wherein the generator is configured to determine whether to generate the group information, in accordance with a time period during which a vehicle is traveling.

3. The movable body monitoring apparatus according to claim 1, wherein the generator is configured to,
    in a time period of daytime, determine that the group information is to be generated, and
    in a time period of nighttime, determine that it is unnecessary to generate the group information.

4. The movable body monitoring apparatus according to claim 2, wherein the generator is configured to,
    in a time period of daytime, determine that the group information is to be generated, and
    in a time period of nighttime, determine that it is unnecessary to generate the group information.

5. A vehicle control system comprising:
    the movable body monitoring apparatus according to claim 1; and
    a vehicle control apparatus configured to control a vehicle on a basis of the monitoring by the movable body monitoring apparatus.

6. A vehicle control system comprising:
    the movable body monitoring apparatus according to claim 2; and
    a vehicle control apparatus configured to control a vehicle on a basis of the monitoring by the movable body monitoring apparatus.

7. A vehicle control system comprising:
    the movable body monitoring apparatus according to claim 3; and
    a vehicle control apparatus configured to control a vehicle on a basis of the monitoring by the movable body monitoring apparatus.

8. A vehicle control system comprising:
    the movable body monitoring apparatus according to claim 4; and
    a vehicle control apparatus configured to control a vehicle on a basis of the monitoring by the movable body monitoring apparatus.

9. A traffic system comprising:
    the movable body monitoring apparatus according to claim 1; and
    a server apparatus configured to transmit and receive movement data related to the movements of the movable bodies to and from the movable body monitoring apparatus.

10. A traffic system comprising:
    the movable body monitoring apparatus according to claim 2; and
    a server apparatus configured to transmit and receive movement data related to the movements of the movable bodies to and from the movable body monitoring apparatus.

11. A traffic system comprising:
the movable body monitoring apparatus according to claim 3; and
a server apparatus configured to transmit and receive movement data related to the movements of the movable bodies to and from the movable body monitoring apparatus.

12. A traffic system comprising:
the movable body monitoring apparatus according to claim 4; and
a server apparatus configured to transmit and receive movement data related to the movements of the movable bodies to and from the movable body monitoring apparatus.

13. A movable body monitoring apparatus configured to be mounted on a movable body and to receive movement data related to movements of other movable bodies, the movable body monitoring apparatus comprising circuitry configured to
acquire the movement data on the other movable bodies,
generate group information on a plurality of low-speed movable bodies which are determined on a basis of actual speeds or types of the other movable bodies,
determine whether to generate the group information, in accordance with a travel environment,
collectively monitor movements of the plurality of low-speed movable bodies using the group information, when the group information is generated, and
individually monitor the movements of the plurality of low-speed movable bodies, when the group information is not generated.

* * * * *